US008990472B2

(12) United States Patent
Sela et al.

(10) Patent No.: US 8,990,472 B2
(45) Date of Patent: Mar. 24, 2015

(54) METHODS AND SYSTEMS FOR RUNNING NETWORK PROTOCOLS OVER PERIPHERAL COMPONENT INTERCONNECT EXPRESS

(71) Applicant: Mellanox Technologies, Ltd., Yokneam (IL)

(72) Inventors: Oren Tzvi Sela, Rosh Pina (IL); Noam Bloch, Bat Shlomo (IL)

(73) Assignee: Mellanox Technologies, Ltd, Yokneam (IL)

( * ) Notice: Subject to any disclaimer, the term of this patent is extended or adjusted under 35 U.S.C. 154(b) by 234 days.

(21) Appl. No.: 13/658,976

(22) Filed: Oct. 24, 2012

(65) Prior Publication Data

US 2014/0115206 A1 Apr. 24, 2014

(51) Int. Cl.
*G06F 13/42* (2006.01)
(52) U.S. Cl.
CPC .... *G06F 13/4221* (2013.01); *G06F 2213/0026* (2013.01)
USPC .......................................... 710/313; 710/315
(58) Field of Classification Search
CPC . G06F 3/0661; G06F 13/387; G06F 13/4221; G06F 2213/0026
USPC .......................... 710/315, 313, 300, 107, 306
See application file for complete search history.

(56) References Cited

U.S. PATENT DOCUMENTS

| 4,972,470 | A * | 11/1990 | Farago | 713/192 |
| 7,937,447 | B1 * | 5/2011 | Cohen et al. | 709/212 |
| 8,412,875 | B2 * | 4/2013 | Suzuki et al. | 710/312 |
| 2008/0195747 | A1 * | 8/2008 | Elmaliah | 709/232 |
| 2009/0265499 | A1 * | 10/2009 | Kang | 710/305 |
| 2011/0022935 | A1 * | 1/2011 | McDaniel | 714/807 |
| 2012/0047293 | A1 * | 2/2012 | Otani et al. | 710/30 |
| 2012/0137031 | A1 * | 5/2012 | Evoy et al. | 710/105 |

FOREIGN PATENT DOCUMENTS

JP 2007108858 A * 4/2007

OTHER PUBLICATIONS

Machine translation of JP2007-108858A.*
Regula, Jack and Shah, Shreyas; "Ethernet Tunneling through PCI Express Inter-Processor Communication, Low Latency Storage I/O"; Computer Technology Review; Jan. 19, 2009; accessed Nov. 18, 2014.*

(Continued)

*Primary Examiner* — Glenn A Auve
(74) *Attorney, Agent, or Firm* — Finnegan, Henderson, Farabow, Garrett & Dunner, LLP (57) ABSTRACT

Methods and devices for running network protocols over Peripheral Component Interconnect Express are disclosed. The methods and devices may receive an electronic signal comprising data. The methods and devices may also determine the data corresponds to a protocol selected from a set comprising a PCIe protocol and a network protocol. In addition, the methods and devices may also configure a CPU based on the determined protocol. The methods and devices may also receive a second electronic signal comprising second data at a pin or land of the CPU, wherein the pin or land is connected to a PCIe lane and wherein the second data is formatted in accordance with determined protocol. In addition, the methods and devices may process the second data in accordance with the determined protocol.

30 Claims, 5 Drawing Sheets

(56) References Cited

OTHER PUBLICATIONS

"PCI Express Ethernet Networking" White Paper; Intel PRO Network Adapters; Intel Corporation; Sep. 2005.*

Rodriguez, Miguel; "Using PCI Express as a fabric for interconnect clustering"; Mar. 7, 2011; accessed Nov. 18, 2014; URL <http://www.embedded.com/design/connectivity/4213842/Using-PCI-Express-as-a-fabric-for-interconnect-clustering>.*

* cited by examiner

METHODS AND SYSTEMS FOR RUNNING
NETWORK PROTOCOLS OVER
PERIPHERAL COMPONENT
INTERCONNECT EXPRESS

TECHNICAL FIELD

The present disclosure relates to the field of network protocols and, more particularly, running network protocols over Peripheral Component Interconnect Express.

BACKGROUND

Peripheral Component Interconnect Express (PCIe) provides a standardized mechanism for connecting hardware components to a processor. One or more PCIe lanes may connect the pins or lands of a processor to various hardware components, including PCI slots that are capable of accepting add-in cards, to enable the processor and hardware components to exchange data.

Often, to enable a system to run a network protocol, an add-in network card, such as a Network Interface Card (if, for example, an Ethernet protocol is used), a Host Channel Adapter (if, for example, InfiniBand protocol is used), or a Host Bus Adapter (if, for example, Fibre Channel protocol is used), is placed in a PCI slot or as an extra component on the motherboard. The add-in network card may be used to provide the system with the network protocol functionality. However, such an arrangement requires communication through both the PCIe lane(s) and the add-in network card, introducing undesirable latency for network communication and possibly added system cost.

Improvements in running network protocols, including running network protocols over Peripheral Component Interconnect Express, are desirable.

SUMMARY

In one disclosed embodiment, a method for an electronic system is disclosed. The method comprises receiving an electronic signal comprising data at a pin or land of a CPU, determining, utilizing the CPU, the data corresponds to a protocol selected from a set comprising a PCIe protocol and a network protocol, and configuring the CPU based on the determined protocol.

In another disclosed embodiment, a method for an electronic system is disclosed. The method comprises receiving an electronic signal comprising data at a pin or land of a CPU, wherein the pin or land is connected to a PCIe lane, wherein the data is formatted in accordance with a network protocol, and processing the data in accordance with the network protocol.

In another disclosed embodiment, a memory device comprising a BIOS (Basic Input/Output System) is disclosed. The BIOS comprises data that is operable to configure a CPU to perform the steps of receiving an electronic signal comprising data at a pin or land of a CPU, wherein the pin or land is connected to a PCIe lane, wherein the data is formatted in accordance with a network protocol, and processing the data in accordance with the network protocol.

In another disclosed embodiment, a CPU is disclosed. The CPU is configured to receive an electronic signal comprising data at a pin or land of the CPU, wherein the pin or land is connected to a PCIe lane, wherein the data is formatted in accordance with a network protocol, and process the data in accordance with the network protocol.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Methods and devices are disclosed for running network protocols over Peripheral Component Interconnect Express. In some embodiments, a CPU is capable of performing the functionality of network add-in card such as, for example, a Network Interface Card (NIC), a Host Channel Adapter (HCA), or a Host Bus Adapter (HBA). In such embodiments, the CPU is configurable such that data received and transmitted from a CPU pin or land connected to a PCIe lane is in conformance with a network protocol such as, for example, Ethernet, InfiniBand, or Fibre Channel.

In some embodiments, a system BIOS stores data that is used to configure the CPU. Thus, for example, if the system contains a network port that should operate in conformance with a particular network protocol, the BIOS may contain data configuring the CPU pin or land that is connected, via one or more PCIe lanes, to the network port to operate in conformance with the particular network protocol. In some embodiments, the necessary CPU configuration may be performed while the system is operating by analyzing data received at CPU pins or lands.

Figure 1:
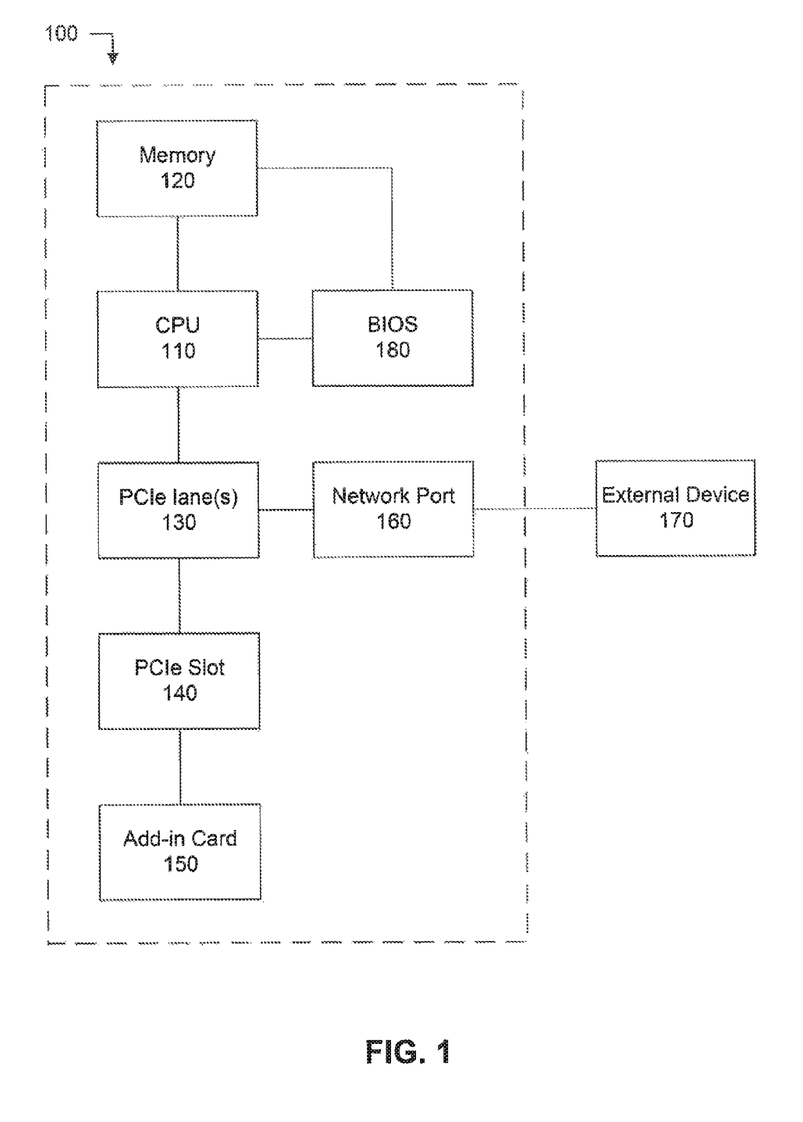
FIG. 1 illustrates an example system that may be used for implementing the disclosed embodiments.

FIG. 1 is a diagram illustrating an example system 100 that may be used for implementing the disclosed embodiments. System 100 may include one or more central processing units (CPUs) 110 configured to execute computer program code to perform various processes and methods, including the embodiments herein described. In some embodiments, CPU 110 may be configured to implement one or more network interfaces (for example, Ethernet, InfiniBand, and/or Fibre Channel). For example, the CPU 110 may be configured to include hardware and/or firmware having the functionality of one or more Network Interface Cards (NICs), Host Channel Adapters (HCAs), or Host Bus Adapters (HBAs) (i.e., the CPU may include an integrated network controller).

System 100 may also include memory 120, such as RAM, EEPROM, or flash memory, to store data and computer program code. In some embodiments, the CPU and integrated network controller may share some or all of memory 120 and/or some or all of internal CPU cache. In addition, system 100 may also include a system BIOS 180 stored on flash memory used to initialize various components of system 100 including, for example, CPU 110 and memory 120.

System 100 may also include one or more PCIe lanes 130 to enable the CPU 110 and other components in the PCIe interface to exchange data. In some embodiments, system 100 includes PCIe slot 140 configured to connect add-in card 150 to the PCIe interface. A network port 160 may also be included in system 100, configured to receive data from an external network device 170 and transmit data to the external network device 170. In some embodiments, external device 170 is a network device, such as a network adapter or network switch, that utilizes a network protocol to transmit and receive data. In other embodiments, external device 170 may be either a network device or a device capable of running on the PCIe protocol.

Figure 2:
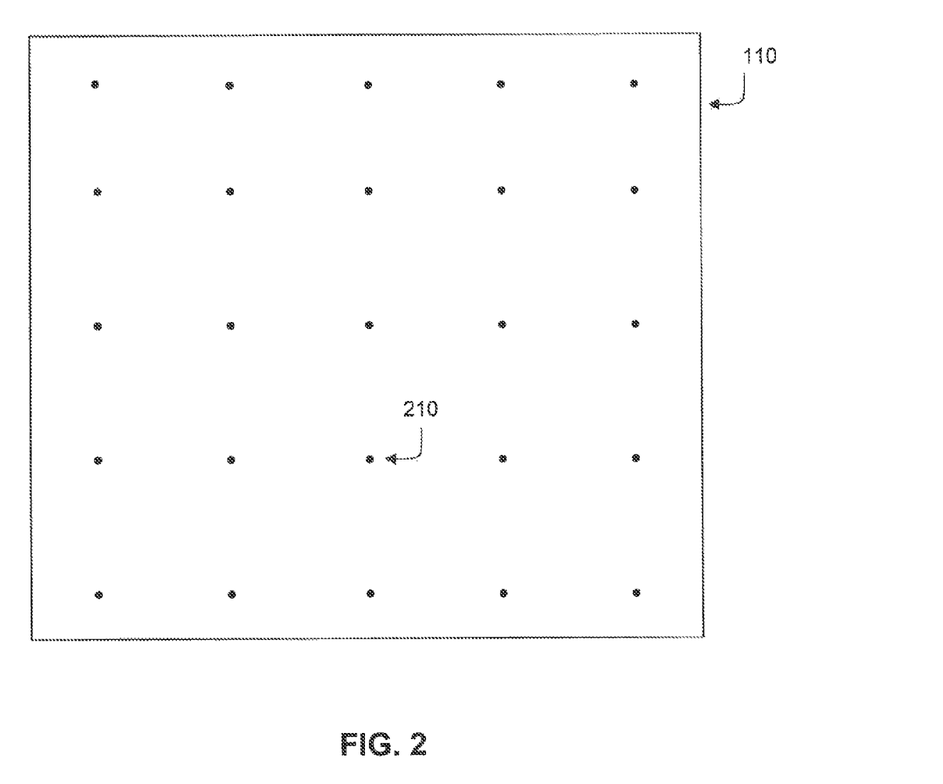
FIG. 2 illustrates an example CPU that may be used for implementing the disclosed embodiments.

As depicted in FIG. 2, CPU 110 includes a number of pins or lands 210. For illustrative purposes, FIG. 2 nominally depicts CPU 110 as comprising 25 pins or lands 210, although CPU 110 may contain any number of pins or lands 210.

Figure 3:
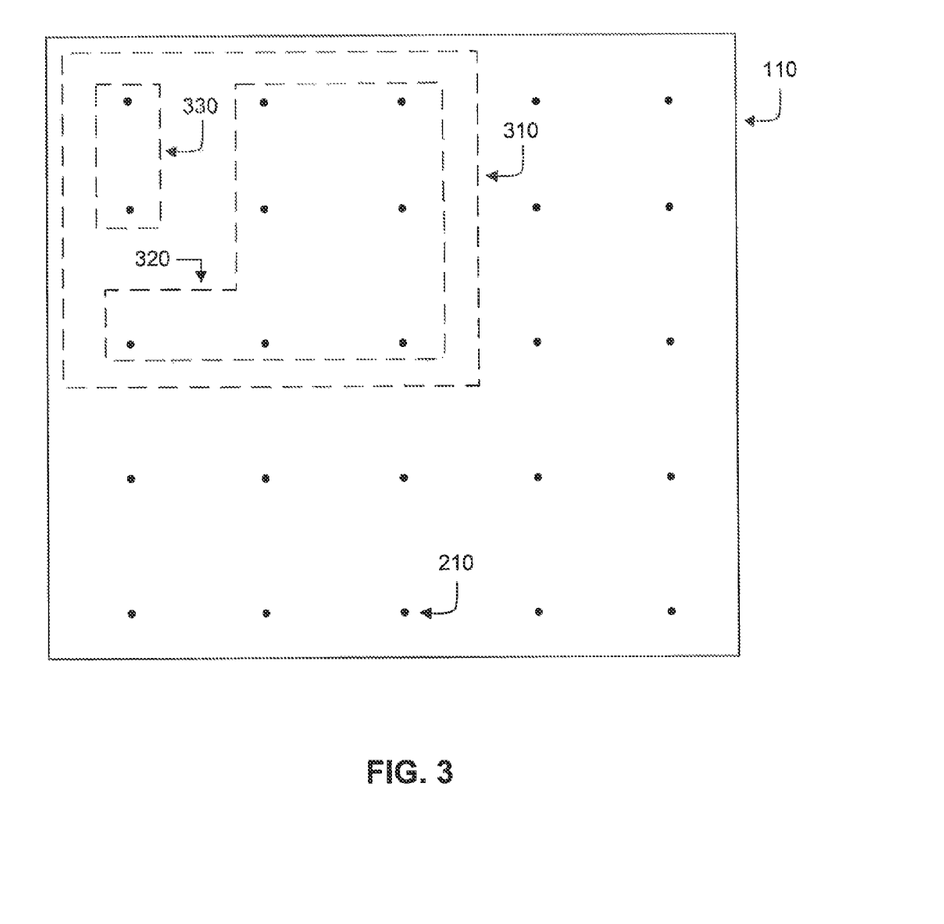
FIG. 3 illustrates an example CPU that may be used for implementing the disclosed embodiments.

FIG. 3 depicts a set 310 of the pins or lands 210 dedicated to PCIe and connected to PCIe lanes 130. Each of at least some of pins or lands 210 may be configured to have a set of properties from a plurality of possible sets of properties. For example, while each of the pins or lands in set 310 may be capable of being configured for PCIe, Ethernet, InfiniBand, Fibre Channel, or other protocol, subset 320 of the set 310 of the pins or lands 210 may be configured to utilize the PCIe protocol and subset 330 of the set 310 of the pins or lands 210 may be configured to utilize an Ethernet, InfiniBand, Fibre Channel, or other protocol.

While FIG. 2 depicts the dedicated PCIe set of pins or lands 310 as including pins or lands configured for PCIe protocol and other pins or lands configured for one network protocol, in alternative embodiments the dedicated PCIe set of pins or lands 310 may include pins or lands configured for PCIe protocol and a plurality of sets of other pins or lands each being configured for a network protocol. For example, one set of PCIe dedicated pins or lands may be configured for PCIe protocol, one set of PCIe dedicated pins or lands may be configured for Ethernet protocol, and one set of PCIe dedicated pins or lands may be configured for InfiniBand protocol (with the set of pins configured for Ethernet protocol connected to a first network port and the set of pins configured for InfiniBand protocol connected to a second network port). Alternatively, for example, one set of PCIe dedicated pins or lands may be configured for PCIe protocol and two set of PCIe dedicated pins or lands may be configured for Ethernet protocol (with each set of pins configured for Ethernet protocol connected to a different network port).

In some embodiments, the configuration of the pins or lands 210 is changeable. That is, CPU pin or land 210 may first be configured for a first protocol and then later configured for a different second protocol. For example, pins or lands 210 of subset 330 may first be configured to utilize an Ethernet protocol and then later configured for an InfiniBand protocol.

Figure 4:
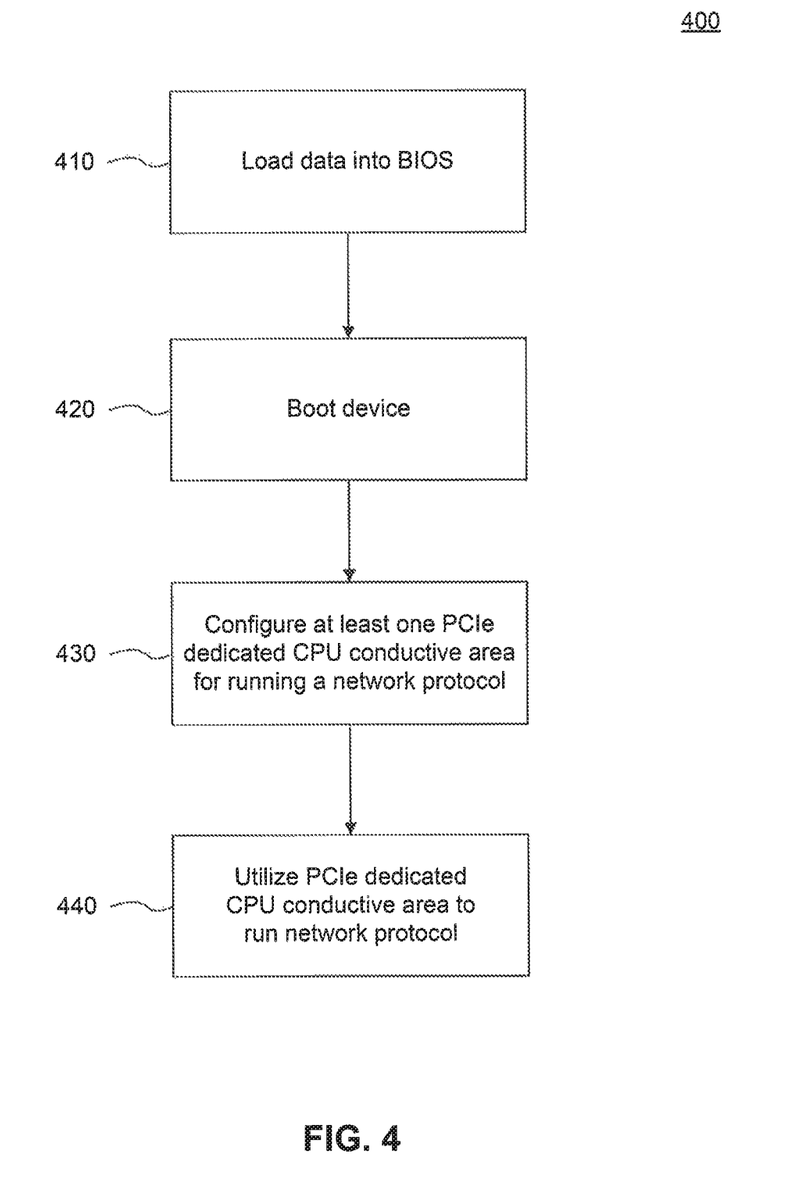
FIG. 4 illustrates an example method for running network protocols over PCIe.

FIG. 4 depicts an example method 400 for running network protocols over PCIe. In some embodiments, method 400 begins by loading data into the BIOS of system 100 (step 410). In some embodiments, the data loaded into BIOS is based, at least in part, on the CPU configuration that is intended. For example, the data loaded into BIOS may provide an indication to configure pins or lands 320 of CPU 110 to utilize the PCIe protocol and to configure pins or lands 330 of CPU 110 to utilize one of an Ethernet, InfiniBand, Fibre Channel, or other protocol. In alternative embodiments, data providing an indication to configure pins or lands 320 of CPU 110 to utilize the PCIe protocol and to configure pins or lands 330 of CPU 110 to utilize one of an Ethernet, InfiniBand, Fibre Channel, or other protocol may be loaded into active component, such as a Complex Programmable Logic Device (CPLD), instead of BIOS.

In some embodiments, the system 100 may then be booted by being turned on, if off, or restarted (step 420). While booting, the BIOS, or in alternative embodiments the CPLD, may be utilized to configure various components in the system 100 including CPU 110 (step 430). In some embodiments, data in the BIOS, or in alternative embodiments data in the CPLD, is utilized to configure the pins or lands 210 of CPU 110, including the PCIe dedicated pins or lands 310. For example, a computer program in the BIOS may be utilized to configure pins or lands 320 of CPU 110 to utilize the PCIe protocol and pins or lands 330 of CPU 110 to utilize a network protocol such as an Ethernet, InfiniBand, Fibre Channel, or other protocol. Alternatively, for example, rather than configuring each of the pins or lands in subsets 320 and 330, a CPLD configuration or a computer program in the BIOS may be utilized to pull up or pull down a strap pin or land that causes a set of pins or lands to utilize a PCIe protocol or a network protocol. For example, pins or lands 210 may include a first strap pin or land and a second strap pin or land. A CPLD configuration or computer program in the BIOS may be utilized to pull up the first strap pin causing pins or lands 320 of CPU 110 to utilize the PCIe protocol and to pull down the second strap pin or land causing pins or lands 330 of CPU 110 to utilize a network protocol such as an Ethernet, InfiniBand, Fibre Channel, or other protocol. Alternatively, for example, a pull-up resistor or a pull-down resistor could be applied to the first strap pin and a pull-up resistor or a pull-down resistor could be applied to the second strap pin to configure pins or lands 320 and 330, enabling the first strap pin and second strap pin to be configured without the use of a CPLD configuration or a computer program in the BIOS. The pins or lands configured to utilize the network protocol may then be used to run the network protocol (step 440).

Figure 5:
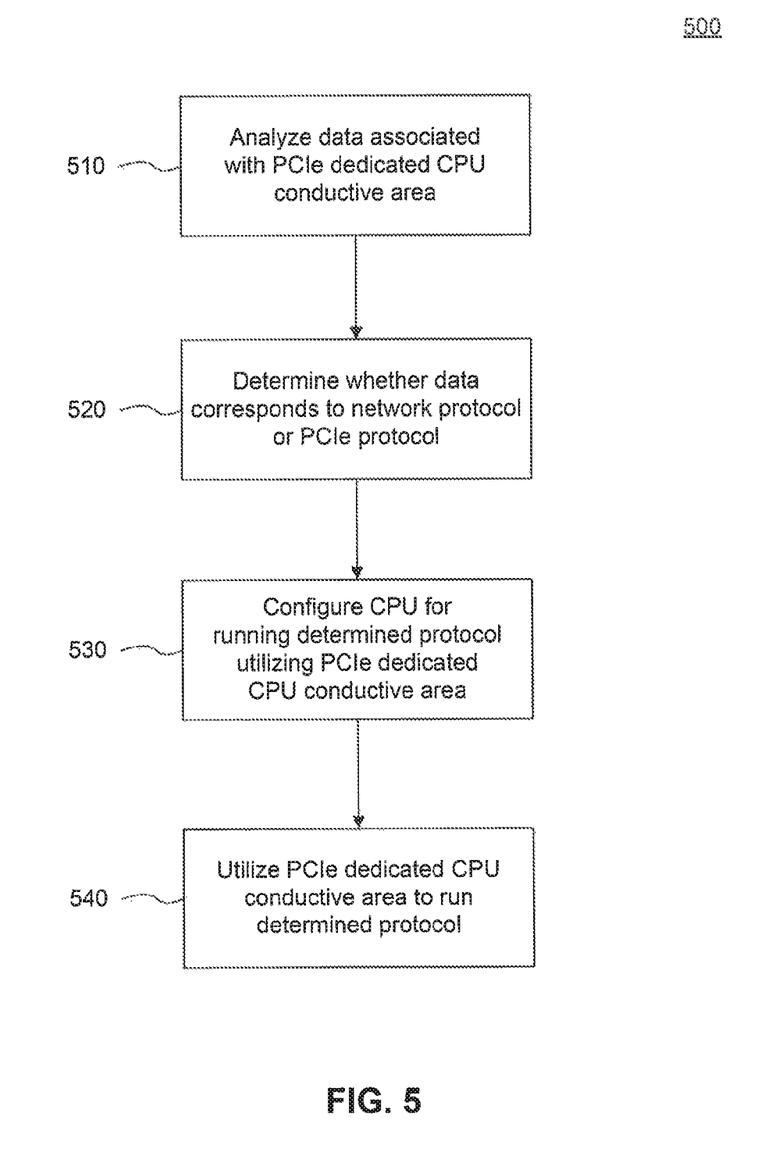
FIG. 5 illustrates an example method for running network protocols over PCIe.

FIG. 5 depicts an example method 500 for running network protocols over PCIe. In some embodiments, method 500 begins by analyzing data associated with a CPU pin or land 210, such as, for example, a PCIe dedicated pin or land 310 (step 510). For example, data received at a PCIe dedicated pin or land 310 may be encoded with training symbols indicative of a certain protocol. In some embodiments, the training symbols are analyzed to determine the protocol associated with the received data.

A determination may then be made as to whether the analyzed data corresponds to a network protocol or a PCIe protocol (step 520). For example, a determination may be made that the data is encoded with training symbols indicative of a PCIe protocol, an Ethernet protocol, an InfiniBand protocol, or a Fibre Channel protocol. In some embodiments, the PCIe dedicated pin or land of the CPU may already be configured for a particular protocol. In such embodiments, the determination may indicate that the PCIe dedicated pin or land is presently configured for a different protocol than the determined protocol. Alternatively, in some embodiments, the PCIe dedicated pin or land of the CPU may not yet be configured for a particular protocol, and thus also not configured for the determined protocol.

Based on the determination, the CPU is configured to run the determined protocol utilizing the PCIe dedicated CPU pin or land (step 530). For example, in some embodiments, the BIOS may be modified and the system 100 restarted to configure the CPU to run the determined protocol utilizing the PCIe dedicated pin or land. In other embodiments, the operating system may be utilized to configure the CPU without requiring the system 100 to be restarted. The pins or lands configured to utilize the network protocol may then be used to run the network protocol (step 540).

By eliminating the need for communication through both the PCIe lanes and an add-in network card, undesirable latency for network communication and overall system cost can be reduced. By enabling the CPU 110 to perform the functionality of an add-in network card, the system 100 can utilize the high speed PCIe lanes 130 to connect the CPU 110 directly to the network port 160. In addition, CPU 110 may provide a system designer with increased flexibility, since the system designer can configure the PCIe pins or lands 310 of CPU 110 in accordance with system needs. For example, a system designer could use the same CPU 110 for both a system that requires one network port and a system that requires two network ports. Furthermore, the overall cost of a system 100 may be reduced since system 100 may operate with the functionality of a network protocol without the expense of a separate network card. While several embodiments discussed above disclose running network protocols over PCIe, in some embodiments network protocols may also be run over other interconnect standards.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or ore modules of computer program instructions encoded on a computer readable medium, e.g., a machine readable storage device, a machine readable storage medium, a memory device, or a machine readable propagated signal, for execution by, or to control the operation of, data processing apparatus.

The term "system" encompasses all apparatus, devices, and machines for processing data, including by way of example a programmable processor, a computer, a server, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or ore cripts stored in a markup language document), in a single file dedicated to the program in question, or n multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). The disclosed order is optional as well.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component. e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for an electronic system, comprising:
   receiving an electronic signal comprising data at a pin or land of a CPU;
   determining, utilizing the CPU, the data corresponds to a protocol selected from a set comprising a PCIe protocol and a network protocol; and
   configuring the CPU based on the determined protocol.

2. The method of claim 1, wherein configuring the CPU comprises configuring the CPU to run the determined protocol utilizing the pin or land.

3. The method of claim 1, wherein the determined protocol is the network protocol.

4. The method of claim 3, further comprising:
   processing second data, received at the pin or land, formatted in accordance with the determined protocol.

5. The method of claim 3, further comprising:
   transmitting second data, via the pin or land, formatted in accordance with the determined protocol.

6. The method of claim 5, wherein the second data is transmitted to a network port.

7. The method of claim 1, wherein the electronic signal is received from a network device.

8. The method of claim 1, wherein the data comprises training symbols indicative of a protocol, and the determination is made based, at least in part, on the training symbols.

9. The method of claim 8, wherein the training symbols are PCIe training symbols, and further wherein configuring the CPU comprises configuring the CPU to run the PCIe protocol utilizing the pin or land.

10. The method of claim 8, wherein the training symbols are network training symbols, and further wherein configuring the CPU comprises configuring the CPU to run the network protocol utilizing the pin or land.

11. The method of claim 1, wherein the network protocol is an Ethernet protocol, an InfiniBand protocol, or a Fibre Channel protocol.

12. A method for an electronic system, comprising:
    receiving an electronic signal comprising data at a pin or land of a CPU, wherein the pin or land is connected to a PCIe lane, wherein the data is formatted in accordance with a network protocol;
    processing the data in accordance with the network protocol.

13. The method of claim 12, wherein the network protocol is an Ethernet protocol, an InfiniBand protocol, or a Fibre Channel protocol.

14. The method of claim 12, further comprising:
    transmitting second data, via the pin or land, formatted in accordance with the network protocol.

15. The method of claim 14, wherein the second data is transmitted to a network port.

16. The method of claim 12, wherein the electronic signal is received from a network device.

17. The method of claim 12, further comprising:
    receiving a second electronic signal comprising second data at the pin or land of the CPU, wherein the second data comprises training symbols indicative of a second network protocol.

18. The method of claim 17, further comprising:
    determining that the second network protocol is different from the network protocol; and
    configuring the CPU based on the determined second network protocol.

19. A memory device comprising a BIOS, wherein the BIOS comprises data that is operable to configure a CPU to perform the steps of:
    receiving an electronic signal comprising data at a pin or land of a CPU, wherein the pin or land is connected to a PCIe lane, wherein the data is formatted in accordance with a network protocol; and
    processing the data in accordance with the network protocol.

20. The memory device of claim 19, wherein the network protocol is an Ethernet protocol, an InfiniBand protocol, or a Fibre Channel protocol.

21. The memory device of claim 19, wherein the BIOS further comprises data that is operable to configure the CPU to perform the step of:
    transmitting second data, via the pin or land, formatted in accordance with the network protocol.

22. The memory device of claim 21, wherein the second data is transmitted to a network port.

23. The memory device of claim 19, wherein the electronic signal is received from a network device.

24. The memory device of claim 19, wherein the BIOS further comprises data that is operable to configure the CPU to perform the step of:
    receiving a second electronic signal comprising second data at the pin or land of the CPU, wherein the second data comprises training symbols indicative of a second network protocol.

25. The memory device of claim 24, wherein the BIOS further comprises data that is operable to configure the CPU to perform the step of:
    determining that the second network protocol is different from the network protocol; and
    configuring the CPU based on the determined second network protocol.

26. A CPU comprising a pin or land, wherein the CPU is configured to perform the steps of:
    receiving an electronic signal comprising data at the pin or land of the CPU, wherein the pin or land is connected to a PCIe lane, wherein the data is formatted in accordance with a network protocol;
    processing the data in accordance with the network protocol.

27. The CPU of claim 26, wherein the network protocol is an Ethernet protocol, an InfiniBand protocol, or a Fibre Channel protocol.

28. The CPU of claim 26, further configured to perform the step of:
    transmitting second data, via the pin or land, formatted in accordance with the network protocol.

29. The CPU of claim 28, wherein the second data is transmitted to a network port.

30. The CPU of claim 26, wherein the electronic signal is received from a network device.

* * * * *